INVENTORS
Jacobus P. Benschop
Johannes J. Broodman

BY Watson, Cole, Grindle & Watson
ATTORNEYS

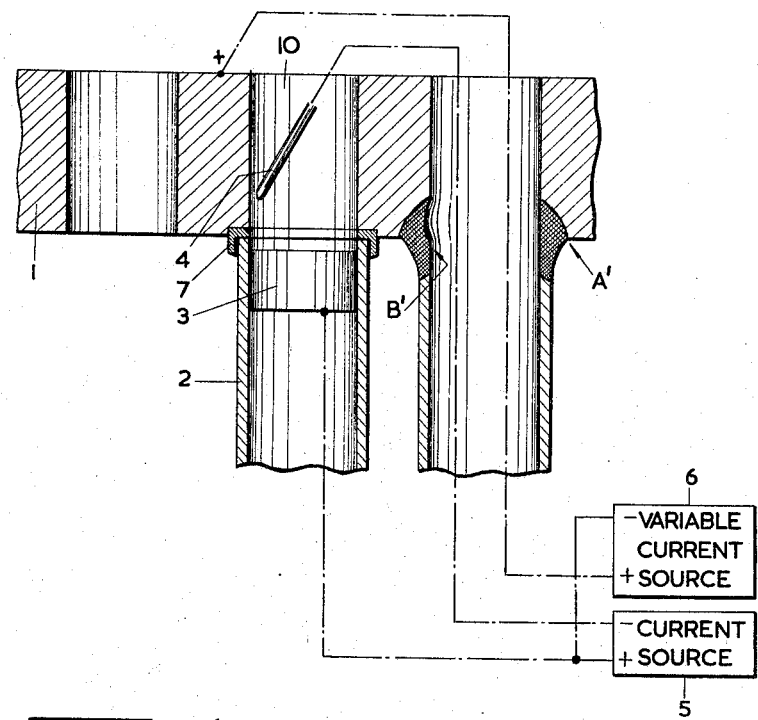
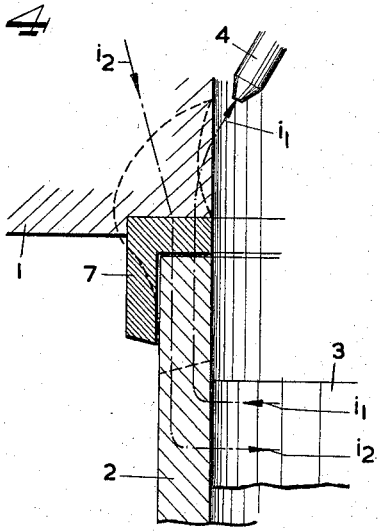

United States Patent Office 3,291,961
Patented Dec. 13, 1966

3,291,961
MEANS AND METHODS FOR ARC WELDING WITH A NON-CONSUMABLE ROD ELECTRODE
Jacobus Petrus Benschop and Johannes Jacobus Broodman, both of Zeeland, Netherlands, assignors to Apparaten-en Ketelfabriek Den Haag N.V., a corporation of the Netherlands
Filed Nov. 30, 1964, Ser. No. 414,539
Claims priority, application Netherlands, Dec. 13, 1963, 301,808
5 Claims. (Cl. 219—137)

The invention relates to means and methods for arc-welding workpieces by means of a non-consumable rod electrode. Up to the present, when two workpieces were welded together with a non-consumable rod electrode, the base of the arc was moved over the seam to be welded, while a counter-electrode was connected at will to one or both of the two workpieces.

With the above-mentioned welding method, however, it is difficult to obtain a uniform weld when the workpieces to be welded differ greatly in thickness or shape as well as in poorly accessible places, where the weld cannot be controlled.

This disadvantage is obviated by the method according to the invention, which is characterized in that one terminal of a source of electricity is connected to one of the workpieces, after which this workpiece is pressed with one of its edges against a second workpiece, so that a zone of contact is formed corresponding to the form of said edge, and that subsequently an arc is struck between a rod electrode connected to the other terminal of the source of electricity and the surface of the second workpiece, near the zone of contact, after which the electrode is moved with respect to the second workpiece in such a way that the base of the arc, i.e., the point where the arc is in contact with the workpiece, describes a path which remains at a constant distance from the zone of contact.

As a result of the above method the passage of the welding current through the melt assumes a marked preferential direction, so that, also owing to the current passing through the workpieces, Lorentz forces directed towards the minus pole are exerted on the melt, which forces give the melt a desirable shape and give rise to a desirable shift of the melt. In consequence the material of the melt can be directed to places where it is most imperative to achieve a good joint.

Since the welding current passes wholly or partly through the melt and at the same time through the contact surfaces of the parts to be joined together, the current also contributes to the evolution of heat in the welding zone.

In consequence of the relatively strong electric field through the melt, electrolytic conduction occurs in the latter. Owing to this and to the driving forces in the melt the contact between the melt and the parts to be welded together, and thus the heat transfer, will be improved.

Since for a given configuration the welding current permits of only a limited variation, it may be necessary to regulate the extent of the above-mentioned effects of current flow with the aid of an extra current originating from a separate source of electricity and thus to weaken or strengthen these effects. By this means the form of the weld can be considerably improved. For this purpose the terminals of the additional source of electricity are connected to one and to the other workpiece respectively.

It is therefore an object of this invention to provide improved means and methods for electric welding with a non-consumable electrode.

The method proposed by this invention is particularly suitable for welding thin-walled tubes to a plate in line with transverse bores in the plate substantially corresponding to the inner diameter of the tubes. This is the case in heat exchangers, in which a large number of closely positioned flow tubes have to be welded to the comparatively thick wall of a container. Because the pipes are close together, no fillet welds can be made where the ends of the tubes are in contact with the inner surface of the container wall. For this reason up to the present each tube to be welded was passed through the bore in the wall until its end was approximately flush with the outer surface of the container wall, after which the end of the tube was welded to this outer surface, or if necessary, to a short vertical tube placed on the surface, surrounding the tube to be welded concentrically.

The disadvantage of this joining method is that a slit, communicating with the interior of the container, remains between the tube and the wall of the bore. Since through this slit there will be hardly any flow of the medium present in the container, corrosion will be apt to occur.

Furthermore the tubes could not be welded via the bore to the inner surface of the container wall, because the weld can hardly be controlled there, if at all. In view of the sudden change from the thin pipe wall to the thick wall of the container, no satisfactory welds have in the past been obtained by this method.

The method according to the invention makes it possible to weld the ends of the tubes directly to the edges of the bores on the inner surface of the container wall. For this purpose one of the connecting terminals is connected to the tube to be welded, which is pressed against the inner surface of the wall or plate in line with the bore, while the tip of the rod electrode is introduced into the bore from the outer surface of the plate, after which an arc is struck between the electrode and the inner surface of the bore at a point near the zone of contact between the tube and the plate, and the electrode is subsequently moved in such a way that the base of the arc describes on the wall of the bore a circular path which remains at a mainly constant distance from the zone of contact between the tube and the plate.

The invention will now be explained more fully by reference to the drawings, which illustrate two embodiments.

FIGURE 3 is a sectional view of a welding arrangement for welding a tube to a perforated plate in line with the bore in the plate.

FIGURE 4 is a diagrammatic view illustrating typical current flow effects used in accordance with the invention.

Figure 1:
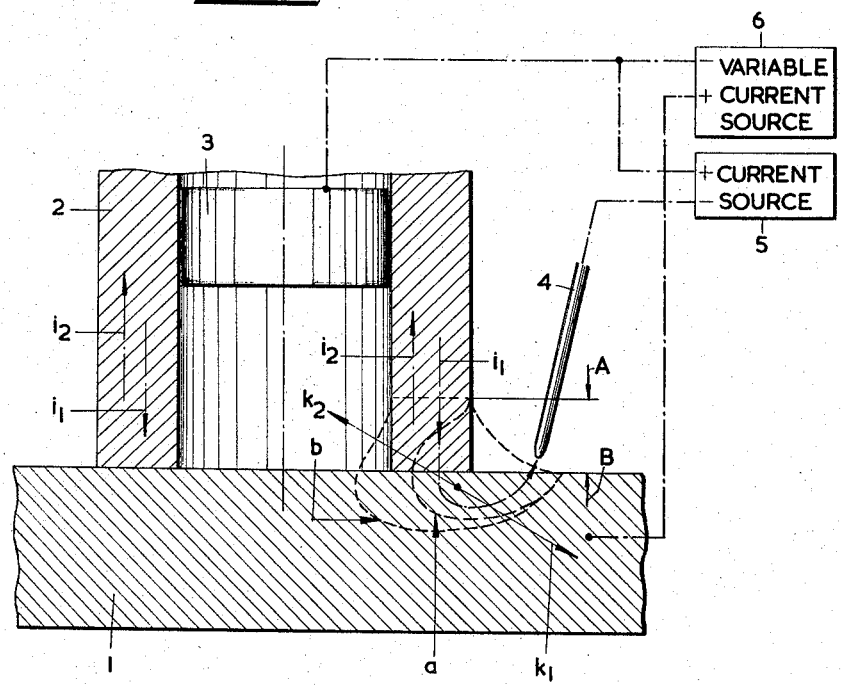
FIGURE 1 is a schematic view partly in section of a welding arrangement for welding a strip or tube to a plate according to the invention.

In the arrangement according to FIGURE 1 the non-consumable tungsten electrode 4 is connected to the negative pole of the polarized welding current source 5. The positive pole of this source is connected via the movable contact block 3 to the strip or tube 2 to be welded. The arc is struck between the electrode 4 and the plate 1 near the contact surface between the tube 2 and the plate 1.

The arc as well as the surface to be welded on the inside of the weld may be surrounded by an atmosphere of shielding gas.

The direction of the current is from the contact block 3 through the tube 2 and through the melt to the electrode 4. The current $i_1$ through the melt in combination with the magnetic field of the current $i_1$ through the tube 2 now exerts a Lorentz force on the melt along the vector $K_1$. In consequence the melt will shift away from the surface to be welded. This force $K_1$ can be used, for instance, to neutralize gravity acting on the melt in the direction of the vector $K_2$, owing to which the melt will sink away into the tube 2.

If gravity is not sufficient or is completely absent, it is possible that the melt will be driven too much in the direction of the electrode, so that the tube 2 becomes too thin near the surface to be welded. In that case an additional source of electricity 6 can be connected to the surface to be welded with one pole to the contact block 3 and the other pole to the plate 1. This source 6 supplies an opposing current $i_2$, which results in a force $K_2$. By supplying this extra current $i_2$ the melt can now be driven in any desired direction.

FIGURE 1a shows a ring 7, which can be placed between the end of the tube 2 and the plate 1 and which will generate additional heat near the welding zone, while extra material can thus be added to the weld in a simple way.

Figure 2:
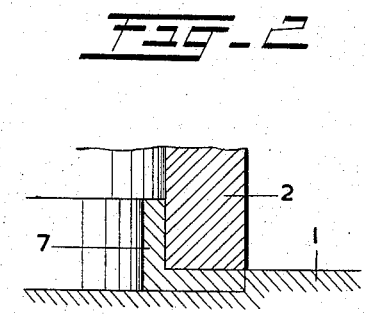
FIGURE 2 is a section view of a workpiece as welded by a modification of the arrangement of FIGURE 1.

The arrangement according to FIGURE 2 illustrates the welding of stainless steel tubes 2 to a stainless steel plate 1 of a container, in line with bores 10 in the plate forming a wall of a heat exchanger. For this purpose a contact block 3 is pushed into that end of the tube 2 to be welded near the end in contact with the container plate 1, said contact block being connected to the positive terminal of the source 6. Into the bore 10 a tungsten electrode 4 is introduced, from the surface of the plate 1 opposite to the surface contacted by the tube ends, i.e., in the drawing from above, which electrode has been connected to the negative terminal of the source 5.

Between the tube 2 and the plate 1 a ring 7 of the same material as that of the plate and the tube is placed. By means of this ring 7 the contact surfaces are adapted to each other more effectively, while extra material can thus be added to the weld and moreover additional generation of heat takes place in consequence of the series connection of the plate with the ring, and the ring with the tube. However, this ring is not essential to the method according to the invention.

After the tube 2 and the ring 7 have been pressed firmly against the preferably bevelled inner edge of the bore 10, the arc is struck between the tip of the electrode and the wall of the bore close above the edge of the tube that has been pressed against the bore edge. The heat which is generated in the arc and in the base of the arc in the surface of the bore will cause the material of the plate 1, the ring 7, and the tube 2 to melt. After the striking of the arc the tip of the tungsten electrode 4 will describe a circular path. During this, the base of the arc will remain at a constant distance from the ring 7 and the edge of the tube 2. As soon as the arc has described a complete circular path, the pipe has been firmly welded to the plate.

Owing to gravity the melt may sink down into the pipe, which now, however, is counteracted by the upwardly directed force resulting from the current $i_1$ through the melt, in consequence of which the latter is driven in the direction of the minus pole, i.e., in this case the rod electrode, as shown in FIGURE 4. The dot-dash lines refer to the possible bounds for the melted metal at different current values $i_1$ and $i_2$.

FIGURE 3 also shows a variable current source 6 for adding an extra opposing current $i_2$ to the surface to be welded. With the aid of this extra current it is possible, as in the case of FIGURE 1, to adjust at will the forces exerted on the melt. If the force exerted on the melt by the current $i_1$ is not sufficient, so that in spite of it the melt sinks down into the pipe and a recess according to B' in FIGURE 2 is formed, this extra current can strengthen the upwardly directing force, so that the melt receives the form A' in FIGURE 2. It stands to reason that the direction of the extra current can also be reversed to aid the current flow $i_1$ if this should be necessary.

Having therefore disclosed with particularity the operating conditions and method steps of this invention, these novel features are defined with particularity in the following claims:

What is claimed is:

1. The method of electric arc welding from a two pole electric current source for joining two workpieces by use of a non consumable rod electrode, comprising the steps of connecting one pole of the electric current source to a first of the workpieces, contacting the two workpieces in a common surface contact zone forming a joinder edge between the workpieces, connecting the non consumable rod electrode to the other pole of the electric current source, striking an arc between the rod electrode and the second of the workpieces at a fixed distance near enough to the zone of contact to cause the material in both workpieces at the zone of contact to melt, moving the electrode adjacent the contacting surfaces at said fixed distance from the contact surface joint to produce the arc in a path on the surface of the second workpiece which path remains at a constant distance from the joint, and choosing the welding current magnitude with the position of the poles at the two workpieces so that the welding current through the melt assumes a marked preferential direction from the second to the first workpiece in a plane through the non consumable electrode and the nearest point of connection with the pole connected to the first workpiece whereby a force is exerted upon the melt in a desired direction by current flow between the pieces.

2. The method of welding defined in claim 1, including the further step of passing a current from one workpiece to the other through the joint, by means of a second polarized current source between the two workpieces to produce a modifying influence on the melt.

3. The method of welding, defined in claim 1, wherein the first workpiece is a thin walled tube and the second is a relatively thick walled plate with a generally flat surface oriented substantially normal to said tube and having a bore in line with the tube, wherein the tip of the rod electrode is introduced into the bore from the surface of the plate not in contact with the tube, and the surface contact zone consists of a substantially abutting contact between the thin walled tube and the generally flat surface.

4. Means for welding two workpieces together comprising a first polarized welding current source, a non-consumable rod electrode coupled to one pole of said source, means connecting the other pole of said source to a first of the workpieces, and means coupling the poles of a second polarized current source between the two workpieces to regulate the shape of the weld.

5. Means as defined in claim 4 wherein the poles of the second polarized current source are connected with the current flow opposing that from the first source.

References Cited by the Examiner

UNITED STATES PATENTS

| | | | |
|---|---|---|---|
| 1,233,434 | 7/1917 | Zuck | 219—137 |
| 2,868,953 | 1/1959 | Gardner | 219—125 |
| 3,125,670 | 3/1964 | Hawthorne | 219—125 |

RICHARD M. WOOD, *Primary Examiner.*

ANTHONY BARTIS, *Examiner.*